United States Patent [19]

Smith et al.

[11] Patent Number: 5,554,667
[45] Date of Patent: Sep. 10, 1996

[54] METHOD OF FORMING A PRIMARY, WET-TO-WET RESIN BOND BETWEEN AT LEAST TWO LAMINATES, AND A PRODUCT BY THE PROCESS THEREOF

[75] Inventors: W. Novis Smith, Philadelphia, Pa.; Mark Livesay, El Cajon, Calif.

[73] Assignee: Sunrez Corporation, El Cajon, Calif.

[21] Appl. No.: 457,843

[22] Filed: Jun. 1, 1995

[51] Int. Cl.⁶ .................................................... C08F 2/46
[52] U.S. Cl. ............................ 522/81; 522/910; 427/513; 428/251; 428/345
[58] Field of Search ................... 522/81, 910; 427/513; 428/251, 345

[56] References Cited

U.S. PATENT DOCUMENTS 5,387,619  2/1995  Lee et al. ................................ 521/133

*Primary Examiner*—Mark Chapman
*Attorney, Agent, or Firm*—John Lezdey

[57] ABSTRACT

The instant invention provides a method of forming a structure which includes at least two laminates each having a minor area of common overlap therebetween and a major area wherein said panels are not overlapped, which comprises the step of forming a primary, wet-to-wet resin bond between said minor areas of common overlap. The invention also contemplates at least one article of manufacture produced by the method.

13 Claims, No Drawings

METHOD OF FORMING A PRIMARY, WET-TO-WET RESIN BOND BETWEEN AT LEAST TWO LAMINATES, AND A PRODUCT BY THE PROCESS THEREOF

FIELD OF THE INVENTION

The instant invention relates to a novel process for the preparation of reinforced composite structures comprising one or more layers of materials provided in cured sections. The invention contemplates an improvement: in resin transfer molding and other vacuum fabrications which are directed specifically to constructing large structures which comprise a plurality of resin-impregnated preformed laminates or panels or sequentially fabricated contiguous sections. More particularly, the invention relates to the formation of primary, i.e. wet-to-wet resin bonds between the common overlap of the panels or sections. The instant invention provides the Progressive Lamination Process (hereinafter referred to as "PLP") which is an advanced modification of the prior art Vacuum Assist Resin Transfer Process (hereinafter referred to as "VARTM"). PLP enables plastics fabricators to use actinically photo-curable resins systems to progressively build relatively large fiber plastic reinforced (FRP) structures such as storage tanks, ships, with a plurality of individual panels or sections which can be field assembled. It is applicable to both reinforced and non-reinforced plastic structures which may employ any known form of reinforcement agents, including but not necessarily limited to: fibers, particles, aggregates and combinations thereof. The process also contemplates non-uniform reinforcement of various types of plastic structures. Reinforcement may be uniform, discrete, or mixed within and between ad acent panels and assemblies.

BACKGROUND OF THE INVENTION

Fiber, particle and/or aggregate reinforced composites have found a broad utility in structures requiring high strength-to-weight ratios. Resin reinforced composites used in such products have usually been produced by forming a lay-up, e.g., layers or piles of particles, aggregates and/or unidirectional or multi-directional fabrics made of glass or graphite fibers, impregnated with resin and cured. This resin impregnation is generally done by either a wet lay-up or dry lay-up technique. In the wet layup process the reinforcement materials are pre-impregnated with a resin and curing catalyst and partially cured.

Such "prior composites" are positioned upon a forming tool or a mold surface which, in its simplest form may comprise a flat plate. In the dry lay-up method, the fiber reinforcement is laid up dry on a forming tool or a mold surface and the resin may be applied by conventional methods know to the art, e.g., brushing, spraying or coating, etc.

After lay-up is prepared, heat and pressure are applied. The heat cures the resin and the pressure compresses the layers, thereby preventing air and other gases, and volatiles, from forming voids within the composite as the resin cures. The curing process is generally carried out in an autoclave.

While monolithic structures formed of fiber reinforced-resin composites processed in the manner described above are satisfactory for some environments, for other environments, they have certain disadvantages. For example, in using the fibers pre-impregnated with resin, gases trapped between the layers when the resin is being cured form weakening voids in the resultant monolithic structure.

Another disadvantage with prior composites is the need to store such materials at low temperatures to prevent curing prior to use. Conventionally, pre-impregnated fiber reinforced layers. which are usually in the form of relatively wide tape or fabric on rolls prior to being laid up, are stored in a refrigerated environment. A further disadvantage is that, even at low temperatures, the resin will cure and-may become unstable and must be discarded.

The disadvantages in the dry lay-up process include the requirement of more resin and greater assembly times. The manner of resin application by brushing or spraying wastes resin and time by requiring the removal of excess resin before the curing process. Additionally, some manual smoothing may be necessary and the sticky resin makes it difficult not to avoid displacement of the reinforcement fibers, thereby adding to production delays.

Vacuum bags techniques are well known in the prior art and encompass both the dry lay-up and dry lay-up processes. After the reinforced fiber is laid up on a forming tool or mold surface, a flexible gas impervious sheet, liner or bag is used to form a sealed vacuum envelope over the lay-up, a heat curable or peroxide catalyzed resin is introduced into the envelope and a vacuum is drawn on the interior envelope space. The vacuum induces an internal collapse or pressure of the film envelope against the mold surface and forces the fiber mat or fabric to follow the mold pattern and pushes or pulls out voids. Thereafter, heat is applied to cure the resin.

The internal collapse of the vacuum envelope restricts the resin from freely flowing through the fiber mat or fabric which has a tendency to trap air or vapors between the vacuum film envelope and the composite structure so as to result in low reinforcing fiber-to-resin ratio and non-uniformity. This reduces production rates and increases production failures and costs.

Some of the presently known vacuum bag techniques avoid several of the above discussed problems by employing a breather fabric with a plastic film which is positioned between the dry lay-up and the inside of the vacuum bag and barrier materials to prevent resin from reaching and plugging the vacuum lines in the bag. The breather bag functions to prevent the outer bag from collapsing completely on the lay-up.

Another approach to preventing bag closure is disclosed in U.S. Pat. No. 4,902,215 to Seeman, which is incorporated herein by reference. Seeman relates to a resin distribution medium comprising spaced-apart plastic monofilaments which are non-resin absorptive and run in a criss-cross fashion and an open array of separated raised segments providing vertically oriented spaced-apart apart props or pillars to prevent closure between the inner face of the flexible sheet and the upper surface of the dry lay-up. The open pillar-like structure and lateral openings between these pillars provide channels for resin to flow over the entire distribution medium without an entrainment of air or volatiles. Both the breather fabric and the reusable resin distribution system of Seeman require additional expense in equipment and production time.

Another approach to improving vacuum bag resin transfer molding techniques involves an improved vacuum bag. U.S. Pat. No. 5,129,813 to Shepherd, also incorporated herein by reference, discloses a non-porous material having a three dimensional pattern defining a plurality of interconnected channels which partially collapses upon the evacuation of the vacuum bag and causes the three-dimensional pattern to relax into the locally flat two dimensional configuration with interconnecting channels. The completely evacuated vacuum bag is in direct contact with the entire surface of the lay-up and the interconnected channels provide free flow of resin and avoids entrapment of gas and volatiles pockets. The flexible film used in making the vacuum bag also can be reused.

In yet another alternative approach, U.S. Pat. No. 4,942,013, to Palmer et al, incorporated herein by reference, teaches a process and system for vacuum impregnation of a fiber reinforcement, such as carbon cloth, with a resin to produce a resin-fiber composite. Liquid resin enters into an arrangement or system comprising a fiber reinforcement layer uniformly across the width thereof and along the length of the fiber reinforcement layer. A fiber reinforcement layer is placed on a tool. A porous parting film is applied over the fiber reinforcement layer and a bleeder layer, such as polyester or nylon, is applied over the parting film. A non-porous film is placed over the bleeder layer, a breather cloth, such as fiberglass, is then applied over the non-porous film, and a vacuum bag is place over the entire assembly and sealed to the mold surface. Liquid resin is fed to the assembly within the vacuum bag. An assembly for spreading the resin receives the liquid resin and distributes it initially across the panel adjacent one end of the reinforcement layer after the vacuum has been applied to the assembly. The liquid resin is drawn through the bleeder cloth and through the fiber reinforcement layer from one end to the opposite end thereof to completely impregnate it. The resin catalyst system is designed so that it will commence to gel the resin when the liquid resin has completely impregnated the fiber reinforcement layer.

U.S. Pat. No. 4,132,755, to Johnson, also incorporated herein by reference, teaches another alternative technique for the manufacture of a composite article. A permeable reinforcing material, such as fiberglass, is deposited on a mold or on a structure to be reinforced. A preferably flexible sheet of perforated material is then placed over the reinforcing material, such that the marginal areas of this sheet are preferably sealed to the mold so as to define an outer chamber. The inner chamber is effectively connected to a vacuum source so as to draw the impervious sheet and along with it the perforated sheet, against the reinforcing material. The outer chamber is connected to a source of catalyzed resin so that the resin is caused to flow from the outer chamber into the reinforcing material through the perforations of the sheet of perforated material. In this manner the material is substantially evenly impregnated with resin without escape of resin fumes into the surrounding atmosphere.

Perhaps most pertinent to the instant improvement, is U.S. Pat. No. 5,166,007, to Smith et al, also incorporated herein by reference. It teaches a patch or repair assembly. The assembly comprises at least one photo-curable pre-impregnated fabric, a UV (ultra-violet) transparent release film on top of the fabric and a UV blocking film over the release film. When applied to a work surface, the assembly forms a secondary wet-to-dry resin bond to the work surface.

With the advancement of the plastics industry in general, and PLP in particular, the fabrication of relatively large FRP structures has evolved into significant acceptance. With the emergence of very large, highly loaded plastic composites, FRP fabricators have been faced with the realities of placing ever increasing amounts of materials and labor at risk during the curing process. To minimize such risk they have shifted to structures which comprise a plurality of panels or subassemblies which can be field assembled. However, prior to the instant invention, fabricators had to rely only upon the use of mechanical fasteners or secondary bonding techniques (e.g., wet-to-dry surface resin bonding) to assemble such sections or subassemblies. Experience has proven that both of these means provide a less than acceptable bond. It has long been known that a primary bond (e.g., wet-to-wet surface resin bonding) provides a union which, unlike mechanical or secondary bonds, provides a strength which rivals that of any other section of the structure. Other advantages of primary bonds include, but are not necessarily limited to: (a) they are less susceptible to contamination; (b) they enable selective fiber orientation across the bond line, thus enabling cross hatching of fibers across the bond line which provide for higher structural efficiencies; (c) they preclude the need for adhesives thereby eliminating the cost and separate curing cycle required by such an adhesive; (d) they eliminate the need for elaborate jigs and fixtures often required for the often precise fitting of a secondary bond; (e) they normally provide for a much simpler inspection than that required by a secondary bond; (f) they substantially preclude the need for surface preparation which would otherwise be required by a secondary bond; and, (g) they are much stronger than secondary bonds.

Thus there exists a long felt need in the art of FRP fabrication by which relatively large structures, such as plastic tanks, can be fabricated by assembling discrete panels or sections which are joined together with primary, wet-to-wet resin bonds.

SUMMARY OF THE INVENTION

As previously noted, the novel PLP process of the instant invention is a significant advancement of the well known VARTM process of the prior art. The most significant difference between the two processes, is the manner in which minor sites or the edges of the individual laminates, panels or subassemblies (hereinafter referred to as "panels") are treated. In the VARTM process, the entire laminate substrate is first flooded with a catalyzed resin and thereafter cured at elevated temperatures to produce the finished panel. Thus the entire panel, including its edges, are cured. In the instant PLP process, the entire laminate substrate is flooded, except for an edge around the entire periphery of the panel which has not been infused with resin or which has been infused with photocurable resin but has not been cured. The edge is of at least one (1) inch wide, or otherwise, a dimension sufficient to enable the creation of an adequate primary, wet-to-wet resin bond upon final assembly of the structure. The present process permits the bonding of dissimilar structures such as a hull to a deck for a boat.

DETAILED DESCRIPTION OF THE INVENTION

In a first preferred embodiment, the invention contemplates a method of forming a structure which includes at least two panels each having a minor area of common overlap therebetween, and a major area wherein the panels are not overlapped; wherein the method comprises: forming a primary, wet-to-wet resin bond between the minor areas of common overlap. At least the first of the at least two panels is substantially entirely infused with a curable resin. The minor area of each of the at least two panels which are to form the overlap and comprises photocurable resin is thereafter photo-shielded. Each major area of the at least two panels is then cured. At least a portion of the minor area of one of the at least two panels is then placed in substantially complete contact with at least a portion of the minor area of another of the at least two panels to form a common overlap, and finally, the common overlap is thereafter photocured.

The instant invention also contemplates a product manufactured by the method of the first preferred embodiment. The product can be stored as long as 12 months, after which it can be transported to a remote work site and primarily bonded to other such components to form a desired structure.

In a second preferred embodiment, the invention contemplates a method of wherein the minor area is substantially entirely infused with a first resin selected from the group consisting of photo-cured resin and photo-cured pre-pregnated resin, and the major area is constructed from a material of construction which are selected from the group consisting of reinforced structures and non-reinforced structures. The reinforced structures include materials of construction which are selected from the group consisting of resin impregnated fibers, resin impregnated particles, resin impregnated aggregates and combinations thereof. The resin impregnated fibers are selected from the group consisting of fiberglass mat infused with photo-cured resin, fiberglass mat infused with pre-pregnated photo-cured resin, fiberglass mat infused with a catalyst-cured resin, fiberglass mat infused with a pre-pregnated catalyst-cured resin, Kevlar (trademark) fiber mat infused with catalyst-cured resin, carbon fiber mat infused with catalyst-cured resin, mixtures of Kevlar (trademark) and carbon fiber mat infused with catalyst-cured resin, Kevlar (trademark) fiber mat pre-impregnated with catalyst-cured resin, carbon fiber mat pre-impregnated with catalyst-cured resin, and mixtures of Kevlar (trademark) and carbon fiber mat pre-impregnated with catalyst-cured resin. Pursuant to the method of the instant second preferred embodiment, at least a portion of the first minor area of one of the at least two panels is first placed in substantially complete contact with at least a portion of the minor area of another of the at least two panels to form the common wet surface to wet surface overlap, whereupon the common overlap is thereafter photo-cured. The instant invention also contemplates a product manufactured from the method of the second preferred embodiment. Here again, the product can be stored for up to 12 months, after which it can be transported to a remote work site and primarily bonded to other such components to form a desired structure.

The invention is not limited to any particular genus of resin. Rather, a wide variety of resins are available that will adequately flow through a dry preform when the invention is practiced in the manner heretofore described. Resins include epoxy, olefinically unsaturated polyesters, acrylic resins, vinyl esters and an olefinically unsaturated monomer copolymerizable therewith. The viscosities of resins range from about 60 cps to about 1000 cps over a temperature range between 200 degrees to 340 degrees F.

The polyester resins used in the invention can be prepared in any convenient manner and is generally composed for one or more aliphatic and/or cycloaliphatic, mono-, di and/or esters thereof. As examples of suitable alcohols may be alcohols and one or more monovalent carboxylic acids and/or esters thereof. As examples of suitable alcohols may be mentioned ethylene glycol, propylene glycol, neopentyl glycol, hexanediol, dimethylol cyclohexane 2,2-bis-(4-hydroxycyclohexyl) propane, 2,2-bis-(p-phenyleneoxyethanol)-propane, 2,2-bis-(p-phenyleneoxypropanol-2)-propane, diethylene glycol, glycerol, trimethylol ethane, trimethylol propane, pentaerythritol and/or dipentaerythritol. Instead of, or besides the alcohol compound(s), one or more epoxy compounds may be used, for example ethylene oxide, propylene oxide, epoxy propanol and isodecanoic glycidyl ester. As examples of suitable di- or polyvalent carboxylic acids may be mentioned maleic acid, fumaric acid, iraconic acid, citraconic acid, malonic acid, succinic acid, glutaric acid, adipic acid, azelaic acid, sebacic acid, tetrahydrophthalic acid, hexahydrophthalic acid, dichlorophthalic acid, isophthalic acid, terephthalic acid and/or trimellitic acid. The carboxylic acid also may be used in the form of an anhydride should be employed besides isophthalic acid and/or orthophthalic acid. Optionally, the polyester resin may contain saturated or unsaturated monocarboxylic acids such as synthetic and/or natural fatty acids having 2 to 36 carbon atoms or esters prepared from these carboxylic acids an polyvalent alcohols such as glycerol. As examples of suitable monocarboxylic acids may be mentioned fatty acid precondensates having 5 to 10 carbon atoms, heptanoic acid, pelargonic acids, isononanoic acid, lauric acid, stearic acid, oleic acid, linoleic acid, cerotic acid, benzoic acid, tert-butylbenzoic acid, acrylic acid and/or methacrylic acid.

The polyester resin may be prepared in any convenient manner, for instance by the melting process, in which reaction of the components takes place with evaporation of the water evolved in the reaction. Alternatively, however, use may be made of the solvent process, in which the water is removed azeotropically with, for instance, an organic solvent such as toluene or xylene, after which generally the volatile constituents are to the desired extent removed in vacuo.

As ethylenically unsaturated monomer any usual monomer may be employed. As examples of suitable monomers may be mentioned styrene, $\alpha$-methyl styrene, vinyl toluene, divinyl benzene, diallyl phthalate and acrylic or methacrylic (hydroxy) esters of alcohols having 1 to 12 carbon atoms such as methanol, ethanol, propanol, butanol, ethylene glycol, propylene glycol, neopentyl glycol, butanediol, hexanediol, polyethylene glycol, glycerol, trimethylol ethane, trimethylol propane and pentaerythritol. It is preferred that styrene should be used. Also suitable are mixtures of monomeric compounds, more particularly mixtures of styrene and other monomers. The monomeric compound is usually present in the composition in an amount of 2 to 55% by weight, based on the polyester composition.

The resin may be cured with free radical generating compounds such as organic peroxide catalysts. A preferred curing method involves photopolymerization. Curing may be done in a continuous manner. The process can be repeated to give a multi-layer composite. Compatible resins may be used to give a multi-layer composite and provide either esthetic affects or increased structural strength or both.

In the present invention, the resin and catalyst may be mixed just prior to introduction into the vacuum envelope or they may be introduced separately relying on the dynamics of the system to mix these compounds sufficiently. In the preferred photocuring process the catalyst can comprise any conventional photoinitiators and/or photosenitizers. Mixtures of photoinitiators may be used. The preferred photoinitiators are the acylphosphine oxides as disclosed in U.S. Pat. No. 4,265,723, which is herein incorporated by reference, and the photosenitizers which have a triplet energy in the range of about 54 to 72 kilocalories per mole as disclosed U.S. Pat. No. 4,017,652, which is herewith incorporated by reference. The preferred photosensitizers are isobutyl benzoin ether and $\alpha$, $\alpha$-diethoxyacetophenone.

Any suitable source that emits ultraviolet light, viz., electromagnetic radiation having a wave length in the range of from about 1800 to about 4000 Angstrom units, may be used in the practice of this invention. Suitable sources are mercury arcs, carbon arcs, low pressure mercury lamps, medium pressure mercury lamps, high pressure mercury lamps, swirling flow plasma arc, ultraviolet light emitting diodes and ultraviolet light emitting lasers. Particularly preferred are ultraviolet light emitting lamps of the medium or high pressure mercury vapor type. Such lamps usually have fused quartz envelopes to withstand the heat and transmit the ultraviolet radiation and are ordinarily in the form of long tubes having an electrode at either end. Examples of these lamps are PPG Models 60-2037, 60-0197, 60-0393, and 60-2081 and Hanovia Models 6512A431, 6542A431, and 6477A431.

The time of exposure to ultraviolet light and the intensity of the ultraviolet light to which the coating composition is exposed may vary greatly. Generally the exposure to ultraviolet light should continue until the polymerization is complete.

EXAMPLE 1

The instant PLP process was used to manufacture a very large rectangular plastic workpiece from a plurality of individual rectangular sections. A first laminate substrate was flooded in the VARTM cavity to form the first rectangular section of the workpiece. An actinically curable resin was used to infuse the entire first section. A mask which was opaque to actinic radiation was placed over the entire one (1) inch peripheral edge of the section corresponding to the desired final primary bond. The entire section was thereafter exposed to actinic radiation curing. The section was thereupon advanced through the VARTM cavity so that substantially only one side of the masked edge remained within the cavity. The repetitive sequence of steps are as follows: (a) the mask of that side was thereafter removed; (b) a new laminate substrate was laid over the entire area defined by the exposed uncured edge and floor of the cavity; (c) the new laminate substrate was thereafter infused with resin to form an uncured portion of the workpiece; (d) the uncured portion was masked on its three unmasked edges; (e) the uncured portion was thereafter exposed to actinic radiation for curing to form a substantially cured workpiece portion; and (f) the workpiece portion was then advanced through the VARTM cavity so that substantially only one side of the masked edge remained within the cavity. Steps (a) to (f) were thereafter repeated until the entire workpiece was completed.

The photocurable resin which can be used can be the same or different depending upon the particular design and utility of the structure.

EXAMPLE 2

The process of Example 1 as used to manufacture a plastic workpiece from two individual sections. Only one of the individual sections was flooding in the VARTM cavity at one time. An actinically curable resin was used to infuse the entire first section. A mask which was opaque to actinic radiation was placed over the entire one (1) inch peripheral edge of the section corresponding to the desired final primary bond. The entire section was thereafter exposed to actinic radiation curing. The same process was repeated for the second section. The panels were thereafter moved to the field site for assembly. The masks were thereafter removed from both sections. Both uncured edges were pressed together to provide wet-to-wet contact, and thereafter exposed to actinic radiation for curing. Here it is important to remember that only the edges of the laminate substrate need be infused with actinic resin. The instant invention contemplates that the interior or major area of the panel may be infused with catalyst curable resins.

EXAMPLE 3

The process of Example 1 was employed to fabricate a plastic structure having a large vertical extension thereon. Each vertical stage was added in the manner described in foregoing Example 2. The VARTM has a practical height limitation for such structures of about thirty (30) feet. Thus the novel PLP process is surprisingly limited only to strength of materials considerations.

EXAMPLE 4

Five (5) layers of 32 oz. ATI 3200 W bi-axial material with a chopped strand glass mat, top and bottom were provided. Peel ply was used as the first layer on the laminate stack. Optionally, the normal gel coat was replaced with peel ply as the first layer against the mold. All of the forgoing materials were laid onto mold for a first panel having the dimensions of ten (10) feet X twenty (20) feet. A spiral wrap plastic conduit was thereafter placed on the vacuum outlet and resin inlet side of the mold. Additional resin supply conduits were placed across the laminate stack at three (3) to four (4) inch intervals to add additional resin to the laminate as the flow path moved across the laminate stack. The panel was then placed under a vacuum bag material such as Quick Draw Film (trademark). A vacuum was thereafter applied to the laminate stack until a negative pressure of five (5) to twenty-nine (29) inches was reached, whereupon the first resin inlet was opened. When the laminate was fully wetted by the resin up to the next resin inlet point, the first resin inlet was closed and the curing of the first partial section was begun using UVA light. After shading the second resin inlet point, the foregoing steps were repeated for each subsequent resin inlet as desired.

EXAMPLE 5

Using the process of Example 1, a laminate was laid out on a surface having a height of twenty (20) feet, wherein resin inlets were spaced at vertical intervals of three (3) feet. After a vacuum was applied to the workpiece, resin was caused to flow through the lowest most inlet. All ports and all of the plumbing of were shaded. After the resin first passed the next highest inlet, the next lower inlet was closed, and the infused section cured. The foregoing three steps were repeated for each higher inlet until the workpiece was completed.

The radiation used for curing by the instant invention includes but is not necessarily limited to: UV, visible light and/or its components, E-beam, and gama rays and combinations thereof.

EXAMPLE 6

All materials are laid onto mold for a flat panel of 10'×20'.

The materials consist of 5 layers of 32 oz ATI 3200 W Biaxial fiberglass material with a chopped strand mat, top and bottom. "Peel Ply" is used at the last layer on the laminate stack. If no gel coat is used on the part, peel ply is also used as the first layer against the mold.

After layout of materials, a Spiral Wrap Plastic conduit is placed on the vacuum outlet and resin inlet side of the mold. Additional resin supply conduits are placed across the laminate stack at 3–4' intervals (FIG. 1). These additional inlets are used to add additional resin to the laminate as the flow path moves across the laminate stack (FIG. 2).

The part is then placed under a vacuum bag material such as Quick Draw Film (a trademark of Film Technology, Inc.) Vacuum is applied to the laminate stack and set at a predetermined level, usually 1–29 inches Mercury. When vacuum integrity has been established, the initial resin entry is opened and a first resin comprising SUNREZ 1704 (a vinylester resin with 35% styrene of Sunrez Inc.) allowed to flow. Choice of which is the first entry point is determined by the part and its layout.

When the laminate is fully wet out up to the next resin entry point, the first entry is turned off and the partial part may be cured, using UVA light, after shading a second resin (Sunrez 444–254, an isophthalate resin with 40% styrene of Sunrez Inc.) This process is repeated for each subsequent resin contact edge as required.

The value of this process is in the fact that resin type and characteristics can be changed throughout the lamination process in that different resins can be infused into different parts of the part as required by part design and yet all resins will be bonded through primary bonds.

EXAMPLE 7

Process used in building a vertical part.

Because of the limitations of vacuum lift, resin to only a maximum height of 15 feet. The tallest part that can be built using a vacuum impregnation system is something under 15'.

Using the P.L.P. process the laminate was laid out on a surface that had a height of 20' and resin entrance tubes placed horizontally every 3'. After the part was placed under vacuum, resin was allowed to enter the lowermost entry point. After the resin passes the next entrance point, to lower resin port is closed. The upper port and plumbing is shaded and the laminate cured from the bottom. After curing the lower laminated area the second resin port is opened and resin allowed to flow upward. This process was repeated for the remaining resin ports until the total part was completed.

In the above example the whole laminate was cured to form a finished product. If this product were to be joined to an adjacent part then the parts would be made as above except that the edges or any other joint location would be shaded to not allow the resin to cure. For illustration we will talk about the edges, but the same process could be used anywhere on the part to achieve primary bonds.

The edges are shielded from the curing light with a suitable mask and not allowed to cure with the rest of the part. Two parts are brought together with similar wet edges and the plies interleaved or lapped over one another and the laminates cured to form a primary bond with each other. Lapping of the plies would not be as strong as a interleaving of the individual plies, but interleaving may not be necessary in some parts. The demonstration was carried out using two laminates of 4 plies of a 21 oz quadraxial fabric one foot by eighteen inches.

Six inches of the laminate was shaded and a one foot by one foot portion of each laminate was cured. After curing the uncured portions of the laminates were interleaved with one another and formed over a 3" diameter pipe. This laminate was cured to form a primary structure which was all primary bond. This same system was used curing only a 6" by 12" section of the laminate and the remaining uncured portion interleaved over a three dimensional corner of a box this was also done by overlapping one laminate over the other.

Hat sections stiffeners were laid up in a mold using the same light curing resin and only the hat portion of the stiffeners cured, the flanges of the hat stiffeners were shaded from curing. The stiffeners were removed from the mold and applied to a center portion of a flat laminate which had not been cured in way of the flanges. Any trapped air in the laminate was rolled out and the stiffeners and remainder of the flat plate cured at one time to form a primary bond.

Although the invention has been described with reference to certain preferred embodiments, it will be appreciated that many variations and modifications my be made within the scope of the broad principles of the invention. Hence, it is intended that the preferred embodiments and all of such variations and modifications be included within the scope and spirit of the invention, as defined by the following claims.

What is claimed is:

1. A method of forming a structure which includes at least two curable laminates or panels each having a photocurable minor area to be joined together and a cured or uncured major area, comprising the steps of:

A. forming a primary, wet-to-wet photocurable resin bond between said minor areas;

B. photo-shielding said minor area of each of said at least two laminates which are to be joined;

C. curing each said major area of said at least two laminates, and then;

D. photocuring the minor areas of overlap of uncured resin.

2. A product manufactured by the method of claim 1.

3. The method of claim 1, including the step of placing at least a portion of the minor area of one of a photocurable laminate in substantially complete contact with at least a portion of the minor area of another of said at least two laminates to form a common overlap; and, photo-curing said common overlap.

4. The method of claim 1, wherein said minor area is substantially entirely infused with a first resin selected from the group consisting of photo-curable resin and photo-curable resin pre-impregnated reinforcing fibers, and said major area is constructed from a material of construction selected from the group consisting of reinforced structures and non-reinforced structures.

5. The method of claim 4, wherein said reinforced structures include materials of construction selected from the group consisting of resin impregnated fibers, resin impregnated particles, resin impregnated aggregates and combinations thereof.

6. The method of claim 5, wherein said resin impregnated fibers are selected from the group consisting of fiberglass mat infused with photo-curable resin, fiberglass mat infused with pre-impregnated photo-curable resin, fiberglass mat infused with a catalyst-cured resin, fiberglass mat infused with a prepregnated catalyst-cured resin, fiber mat infused with catalystcured resin, carbon fiber mat infused with catalyst-cured resin, mixtures of polymeric fiber and carbon fiber mat infused with catalyst-cured resin, polymeric fiber mat pre-impregnated with catalyst-cured resin, carbon fiber mat pre-impregnated with catalyst-cured resin, and mixtures of polymeric and carbon fiber mat pre-impregnated with catalyst-cured resin.

7. The method of claim 6, further comprising:

placing at least a portion of a first minor area of one of said at least two laminates in substantially complete contact with at least a portion of the minor area of another of said at least two laminates to form said common overlap; and, photo-curing said common overlap by one of the group consisting of UV, visible light, individual components of visible light, E-beam, gamma rays and combinations thereof.

8. A product manufactured by the method of claim 7.

9. The method of claim 1 wherein two panels are of different shapes.

10. Method of claim 1 wherein one or more edges of the main section are shielded from light and the main section is cured. Then, this section is repositioned with incured resin or resin pre-impregnated glass reinforcement fibers and cured.

11. The method of claim 10 wherein the additional section or resin is added in a district second step prior to curing the wet-wet overlapping edges.

12. A method of forming a structure which includes at least two different panels in abutment, said panels at the area of abutment having a photocurable site which comprises the steps of:

a) forming a primary wet-to-wet photocurable resin bond between the photocurable sites, and b) photocuring said panels at the sites to form a bond.

13. A product manufactured by the method of claim 12.

* * * * *